United States Patent [19]

Östling et al.

[11] Patent Number: 4,598,443
[45] Date of Patent: Jul. 8, 1986

[54] DEVICE FOR PROVIDING A CLAMPING JOINT

[75] Inventors: Sture Östling, Katrineholm; Bengt Lundgren, Lerum, both of Sweden

[73] Assignee: SKF Nova AB, Gothenburg, Sweden

[21] Appl. No.: 572,877

[22] Filed: Jan. 23, 1984

[30] Foreign Application Priority Data

Mar. 29, 1983 [SE] Sweden .............................. 8301739

[51] Int. Cl.$^4$ .......................... B25G 3/20; F16B 2/00
[52] U.S. Cl. ................................. 24/136 R; 24/136 B; 24/132 WL; 24/115 M; 403/370; 403/371; 403/374
[58] Field of Search ............... 403/374, 371, 367, 370, 403/314; 24/136 R, 136 B, 122.6, 115 M, 129 W, 130, 132 WL

[56] References Cited

U.S. PATENT DOCUMENTS

| | | | |
|---|---|---|---|
| 1,064,663 | 6/1913 | Maynard | 403/367 |
| 1,647,398 | 11/1927 | Draheim et al. | 24/115 M |
| 2,043,272 | 6/1936 | Wallgren | 403/370 |
| 2,484,192 | 10/1949 | Squiller | 403/367 |
| 3,253,332 | 5/1966 | Howlett et al. | 403/314 |
| 3,501,183 | 3/1970 | Stratienko | 403/371 |
| 3,518,748 | 7/1970 | Howlett | 403/314 |
| 3,847,493 | 11/1974 | Peter et al. | 403/371 |
| 3,849,015 | 11/1974 | Peter et al. | 403/371 |
| 4,407,603 | 10/1983 | Lundgren | 403/374 |
| 4,411,551 | 10/1983 | Adelbratt | 403/374 |

*Primary Examiner*—Victor N. Sakran

[57] ABSTRACT

A device for providing a clamping joint comprises two elements (1,2) with complementary threads, each having a flange constituting a clamping surface. Clamping takes place upon relative axial displacement of the elements (1,2) which can be brought about by screws (4) arranged axially in bores in a flange (5) on one element. In order to prevent accidental disengagement of the elements, at least one of the threads adjoins at one end to a part (6) which is wedged against an opposing thread flank when the elements (1,2) are rotated in relation to each other over a predetermined end position.

8 Claims, 7 Drawing Figures

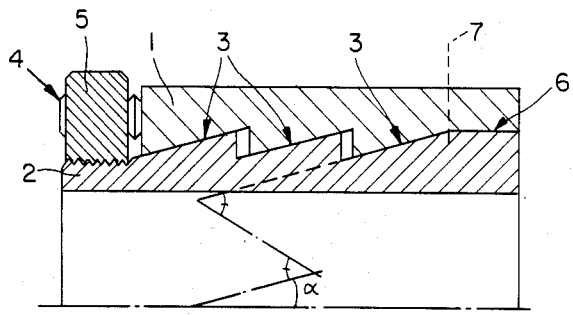
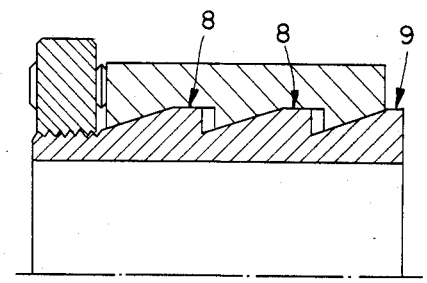
FIG. 1  FIG. 2
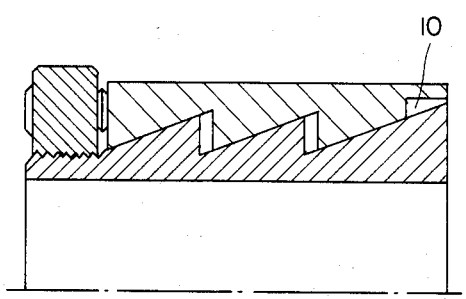
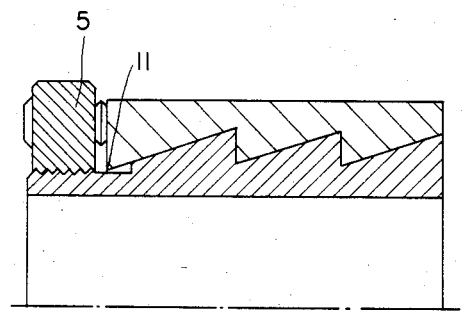
FIG. 3  FIG. 4
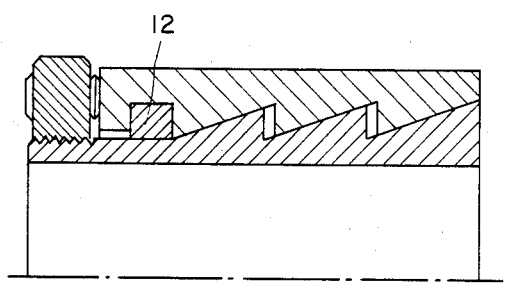
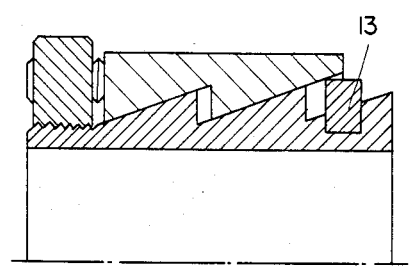
FIG. 5  FIG. 6

DEVICE FOR PROVIDING A CLAMPING JOINT

FIELD OF THE INVENTION

The present invention relates to a device for providing a friction joint and more specifically to a device which incorporates novel anti-rotation means for the sleeve members comprising the friction joint elements.

BACKGROUND OF THE INVENTION

Such devices are known, e.g. by the Swedish published patent application No. 7909531-1. Lundgren U.S. Pat. No. 4,407,603 for FRICTION JOINT is based on and is the U.S. counterpart of Swedish published patent application No. 7909531-1. The cooperating elements consisting of clamping sleeves in such devices can be produced and mounted easily.

One disadvantage of such devices is that the elements are usually provided with threads which are so arranged on the clamping surfaces that there is a certain risk for disengaging the joint by rotating the elements in relation to each other. The elements are thereby disengaged as the wedging force ceased. A possible way of preventing relative rotation of the elements is to let the screws used for axially displacing one element on the other element and arranged through axial bores in one element engage into recesses in the end surface of the other element. Such recesses, however, make manufacture, assembly and handling of the elements complicated.

The object of the present invention is to provide a device of the kind referred to above, which can be manufactured and assembled easily and in which the clamping elements cannot be rotated in relation to each other after the joint has been established, whereby prevention of accidental disengagement of the joint is assured.

This object is achieved according to the invention by providing the device with the characterizing features recited in claim 1.

Such a device can be manufactured in a simple manner and be assembled without the locking screws of the clamping element having to be connected to special recesses or having to deform the end surface of one of the elements in order to lock the elements against relative rotation.

BRIEF DESCRIPTION OF THE DRAWINGS

The following is a detailed description of the invention with reference to the accompanying drawing, in which FIGS. 1-7 show longitudinal sections of different embodiments of the invention, each comprising an inner and outer clamping sleeve and FIG. 8 is a perspective view of the components of the embodiment of clamping device shown in FIG. 1.

DESCRIPTION OF THE PREFERRED EMBODIMENTS

Figure 7:
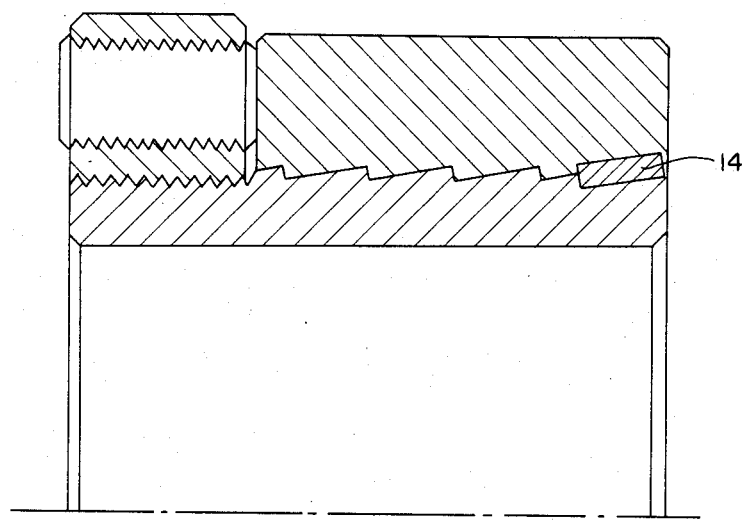

FIG. 1 shows a device comprising a first element in the form of an outer sleeve 1, and a second element in the form of an inner sleeve 2 provided in the bore of the outer sleeve. When in use, the inner sleeve may enclose a shaft or the like, and the outer sleeve may be connected to or be a part of a member which is to be connected to the shaft. The device may also be used for connecting two shafts, whereby the sleeves are arranged so that they enclose end portions of two shafts whose ends meet in the middle of the inner sleeve.

When a clamping joint is established the inner sleeve is deformed radially inwards and pressed against the enclosed shaft or the like. This can be done by the fact that the bore of the outer sleeve and the envelope surface of the inner sleeve are provided with cooperating clamping surfaces. These surfaces are arranged in a threaded portion in each sleeve. The threads are made with a great pitch and one thread flank 3 is so shaped that its longitudinal section profile forms a comparatively small angle $\alpha$ with the axis of the thread. The other thread flank is suitably about perpendicular to this axis. When the outer sleeve 1 is displaced axially to the right on the inner sleeve 2 without being rotated, the cooperating thread flanks 3 give a wedging action, which exerts a radially inwardly directed force component to the inner sleeve 2 which deforms the sleeve into contact against the shaft. The axial displacement can be achieved by a number of screws 4 provided in axial threaded bores through a flange 5 on the inner sleeve 2 and abutting against the end surface of the outer sleeve 1 when they are screwed through the flange 5.

After the joint is established, the sleeves 1 and 2 must not be rotated in relation to each other so that further axial displacement takes place and the contact between the screws 4 and the sleeve 1 ceases, since in that case the thread flanks of the sleeve 1 can slide back down the thread flanks of the sleeve 2, whereby the wedging action and thereby the clamping force ceases. In order to prevent such rotation of the sleeves, at least one of the threads with said thread flanks is, according to the invention, in one end adjoining to a part which is wedged against the opposing thread flank when the sleeves are rotated in relation to each other in the direction which makes the contact between the sleeve 1 and the screws 4 tend to cease. In the embodiment according to FIG. 1 this part is a cylindrical portion 6 of the inner sleeve, the diameter of this portion being about equal to the diameter of the crests of the thread flanks of the inner sleeve. When the threads are made on the sleeves, the thread cutting is suitably started at the position 7 and ended at the left end. Mounting of the outer sleeve on the inner sleeve can be brought about by screwing the outer sleeve on to the inner sleeve from the left when the flange 5 is removed. The outer sleeve can be screwed forward until its thread reaches the portion 6, against which it is wedged when it is rotated further. The axial displacement of the sleeve 1 on the sleeve 2 by means of the screws 4 is not prevented by this arrangement, thus the clamping joint can be established in the usual way without disturbance.

FIG. 2 shows another embodiment of the invention, according to which the crest to the thread flanks of the inner sleeve is truncated into a cylindrical portion 8 and the bottom of the thread flanks of the outer sleeve is filled out into a corresponding cylindrical portion except in an area 9 at one end of the flanks. Thereby the right hand end of the thread of the outer sleeve is wedged against the area 9 in connection to the thread of the inner sleeve when the outer sleeve is screwed to the right over the inner sleeve.

FIG. 3 shows an embodiment in which the thread flank of the inner sleeve is prolonged in an area 10 at one end of the thread. When the outer sleeve is screwed to the right on the inner sleeve, a portion of the thread flank of the outer sleeve is wedged against the prolonged thread flank.

In the embodiment according to FIG. 4, the flank of the thread of the outer sleeve is prolonged in an area 11 at the left hand end. The inner sleeve is depressed in the corresponding area in order to permit the outer sleeve to be displaced over the threads on which the flange 5 is mounted. This embodiment operates in a manner similar to the operation of the embodiment of FIG. 3.

FIG. 5 shows an embodiment in which a cylindrical portion 12 at one end of the thread of the outer sleeve is wedged against the flank of the thread of the inner sleeve when the outer sleeve is screwed to the right on the inner sleeve. Possibly, the wedged portion can be a ring which is placed in a groove in the bore of the outer sleeve, which is shown by a hatched area.

FIG. 6 shows that a corresponding ring 13 can be arranged in a groove in the inner sleeve and be wedged against a thread flank in the outer sleeve.

FIG. 7 shows another variant of a ring 14 which has a purely conical surface cooperating with an opposing thread flank, which is wedged against the conical surface when the outer sleeve is screwed to the right on the inner sleeve. The ring is suitably arranged in a recess the bottom of which has a circular conical shape. A slotted or a two-part ring can easily be mounted in such a recess. The ring may possibly be replaced by a wire which is wound a number of turns around a conical surface, whereby the outline of the wound wire is approximately conical.

The invention is not limited to the described embodiments, but other constructions ae possible. For example, the threads with their flanks may be provided on other elements than sleeves, e.g. directly in a shaft or a hub. The rotation preventing parts need not be cylindrical or conical or be constituted by prolonged thread flanks, but can have other shapes. The same is valid also for the shape of possible rings 13, 14.

What is claimed is:

1. A device for producing a friction joint comprising inner and outer sleeve members having cooperating confronting clamping surfaces in the form of helical thread flanks having inclined longitudinal section profiles forming a comparatively small angle ($\alpha$) to the axis of the thread, means for actuating said sleeve members axially relative to one another effecting radial displacement through said inclined surfaces without rotation of said sleeve members and thereby establishing a clamping joint between said sleeve members, said thread flanks perrmitting rotation of said sleeve members relative to one another and sleeve anti-rotation means operatively associated soley with predetermined thread flanks of said sleeve members to produce a wedging action by interaction between thread flanks only when said sleeve members have been rotated relative to one another to a predetermined end position and thereby prevent further rotation of said sleeve members beyond said predetermined position.

2. A device as claimed in claim 1 wherein said sleeve anti-rotation means comprises a cylindrical portion at one end of the inner sleeve member having a diameter substantially equal to crests of the thread flanks of the inner sleeve member and wherein said outer sleeve member is provided with a complementary cylindrical portion adjacent one axial end thereof whereby said sleeve members can be rotated relative to one another until the cylindrical portions of said sleeve members are in overlying confronting relation.

3. A device as claimed in claim 1 wherein the crest of the threaded flanks of the inner sleeve are truncated into cylindrical portions (8) except for the terminal thread flank adjacent one axial end of the inner sleeve whereby the end thread of the outer sleeve adjacent one axial end thereof wedges against said terminal thread flank of the inner sleeve when the sleeves are rotated relative to one another to a predetermined position.

4. A device as claimed in claim 1 wherein the thread flank of the inner sleeve is prolonged in an area (10) at one end of the thread whereby said sleeve members may be rotated relative to one another to a predetermined position wherein a portion of the thread flank of the outer sleeve wedges against said prolonged thread flank to prevent further relative rotation of said sleeve members.

5. A device as claimed in claim 1 wherein the flank of the thread of the outer sleeve is prolonged in an area (11) at one axial end and said inner sleeve is depressed in a complementary area whereby said sleeve members may be rotated relative to one another to a predetermined position wherein a portion of the thread flank of the outer sleeve wedges against said prolonged thread flank to prevent further relative rotation of said sleeve members.

6. A device as claimed in claim 1 wherein said sleeve anti-rotation means comprises a ring member mounted in a groove in the bore of the outer sleeve adjacent one axial end thereof which upon rotation of said sleeve members to a predetermined position wedges against a flank of the inner sleeve to prevent further rotation of said sleeve members beyond said predetermined position.

7. A device as claimed in claim 1 wherein said sleeve anti-rotation means comprises a ring member mounted in a groove in the outer periphery of the inner sleeve at one axial end thereof which upon rotation of said sleeve members to a predetermined position wedges against a flank of the inner sleeve to prevent further rotation of said sleeve members beyond said predetermined position.

8. A device as claimed in claim 1 wherein said anti-rotation means comprises a ring member interposed between the threads of said sleeve members, said ring member having a conical surface cooperating with an opposing thread flank which is wedged against the conical surface when the sleeve members are rotated relative to one another to a predetermined position.

* * * * *